United States Patent
Yang et al.

(10) Patent No.: US 10,102,434 B2
(45) Date of Patent: Oct. 16, 2018

(54) LANE DETECTION SYSTEM AND METHOD

(71) Applicant: OmniVision Technologies, Inc., Santa Clara, CA (US)

(72) Inventors: Lei Yang, Sunnyvale, CA (US); Donghui Wu, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 43 days.

(21) Appl. No.: 14/978,873

(22) Filed: Dec. 22, 2015

(65) Prior Publication Data
US 2017/0177951 A1 Jun. 22, 2017

(51) Int. Cl.
*G06K 9/00* (2006.01)
*G06T 7/00* (2017.01)

(52) U.S. Cl.
CPC ........ *G06K 9/00798* (2013.01); *G06T 7/0081* (2013.01); *G06T 7/0091* (2013.01); *G06T 2207/20036* (2013.01); *G06T 2207/30256* (2013.01)

(58) Field of Classification Search
CPC . G06K 9/00798; G06T 7/0081; G06T 7/0091; G06T 2207/30256; G06T 2207/20036
USPC .................................. 382/103, 104
See application file for complete search history.

(56) References Cited

U.S. PATENT DOCUMENTS

| 6,728,412 B1 | 4/2004 | Vasylyev |
| 6,823,241 B2 | 11/2004 | Shirato et al. |
| 7,346,190 B2 | 3/2008 | Taniguchi et al. |
| 8,305,445 B2 | 11/2012 | Mori |
| 2010/0309674 A1* | 12/2010 | Su .................... B60G 17/01908 362/466 |
| 2011/0298602 A1 | 12/2011 | Chen et al. |

(Continued)

FOREIGN PATENT DOCUMENTS

TW 200922816 A 6/2009

OTHER PUBLICATIONS

Wang, Yue, Eam Khwang Teoh, and Dinggang Shen. "Lane detection and tracking using B-Snake." Image and Vision computing 22.4 (2004): 269-280.*

(Continued)

*Primary Examiner* — Andrew Moyer
(74) *Attorney, Agent, or Firm* — Lathrop Gage LLP

(57) ABSTRACT

A lane detection system includes a non-volatile memory storing machine-readable instructions and an image processor capable of receiving a road image. The image processor, when executing the machine-readable instructions, is capable of: (i) processing the road image to identify a lane candidate within a lane-existing region of the road image, the lane-existing region having (a) a near subregion including an imaged road region nearer to the vehicle and (b) a far subregion including an imaged road region farther from the vehicle, (ii) verifying the lane candidate as a true lane candidate when a minimum distance between (a) a line fit to a portion of the lane candidate in the near subregion and (b) a predetermined reference point in the road image is less than a neighborhood distance; and (iii) extending the true lane candidate into the far subregion to form a detected lane marker demarcating the lane marker.

26 Claims, 12 Drawing Sheets

(56) References Cited

U.S. PATENT DOCUMENTS

| | | | |
|---|---|---|---|
| 2013/0202155 A1* | 8/2013 | Karanam | G06K 9/00798 382/104 |
| 2015/0248771 A1* | 9/2015 | Kim | G06T 7/0083 382/169 |
| 2017/0177951 A1 | 6/2017 | Yang et al. | |

OTHER PUBLICATIONS

Radu Danescu et al., Robust Real-Time Lane Delimiting Features Extraction, paper for Technical University of Cluj Napoca; 2006; 6 pages.

Anjali Goel; Lane Detection Techniques—A Review; IJCSMC, vol. 3 Issue 2, Feb. 2014; p. 596-602.

R. G. Lotte; Roads Centre-Axis Extraction in Airborne SAR Images: An Approach Based on Active Contour Model With the Use of Semi-Automatic Seeding; IAPRSSIS, vol. XL-1/W1, May 2013. pp. 207-212.

Gurveen Kaur et al.; Lane Detection Techniques: A Review; Int'l Journal of Computer Applications vol. 112, No. 10, Feb. 2015; pp. 4-8.

Ju-Young Kim et al.; A simple model for a lane detection system; SPIE, 2011. 3 pages.

Sushil Kumar Singh et al; Various Methods for Edge Detection in Digital Image Processing; IJCST, vol. 2, Issue 2, Jun. 2011. pp. 188-190.

Xiaoyun Wang et al.; Robust Lane Detection Based on Gradient-Pairs Constraint; Proceedings of the 30th Chinese Control Conference; Jul. 2011. pp. 3181-3185.

Office Action corresponding to Taiwanese Patent Application No. 105138925, dated Jul. 11, 2017.

Non-Final Rejection in U.S. Appl. No. 15/233,675 dated Jan. 11, 2018, 7 pp.

* cited by examiner

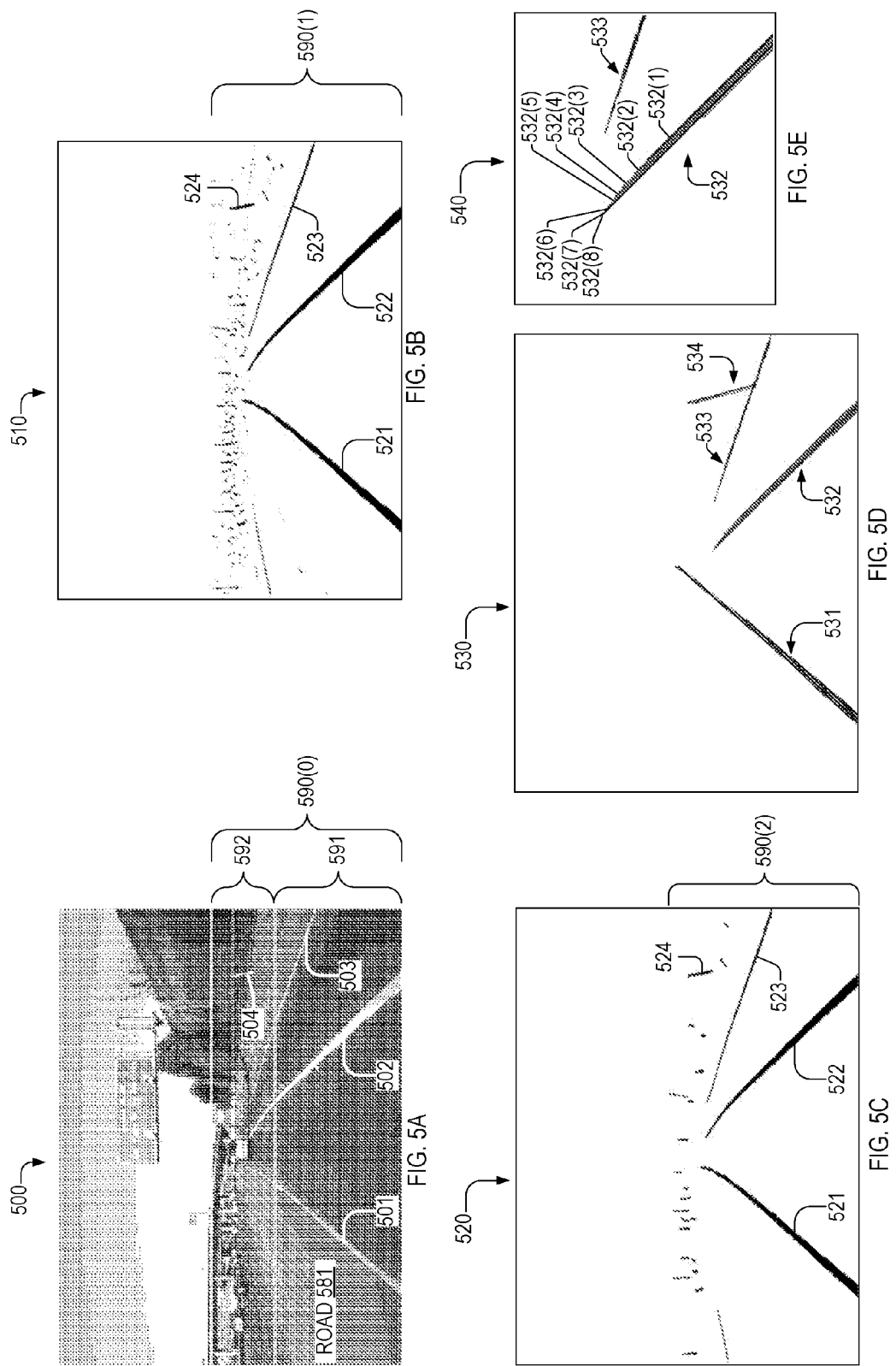

LANE DETECTION SYSTEM AND METHOD

BACKGROUND

An increasing number of new road vehicles are equipped with a lane departure warning system designed to monitor the position of the vehicle with respect to a lane boundary on a road. Central to a lane departure warning system is a robust lane marker detection algorithm module to provide meaningful and consistent lane information for driving safety and navigation purposes. Conventional lane-detection algorithms rely on feature detection schemes that include at least one of the following drawbacks: noise sensitivity, computational complexity, and complex hardware implementation.

SUMMARY OF THE INVENTION

The disclosed lane detection system and method overcomes problems of conventional lane-detection schemes. In an embodiment, a method detects a lane within a road image captured from the front of a vehicle traveling along a road having a lane marker. The method includes processing the road image to identify a lane candidate within a lane-existing region of the road image. The lane-existing region has (a) a near subregion that includes an imaged road region nearer to the vehicle and (b) a far subregion that includes an imaged road region farther from the vehicle. The method also includes verifying the lane candidate as a true lane candidate when a minimum distance between (a) a line fit to a portion of the lane candidate in the near subregion and (b) a predetermined reference point in the road image is less than a neighborhood distance. The method also includes extending the true lane candidate into the far subregion to form a detected lane marker demarcating the lane marker.

In an embodiment, a lane detection system detects a lane within a road image captured along a road having a lane marker. The lane detection system includes a non-volatile memory storing machine-readable instructions and an image processor capable of receiving the road image. The image processor, when executing the machine-readable instructions, is capable of: (i) processing the road image to identify a lane candidate within a lane-existing region of the road image, the lane-existing region having (a) a near subregion including an imaged road region nearer to the vehicle and (b) a far subregion including an imaged road region farther from the vehicle, (ii) verifying the lane candidate as a true lane candidate when a distance between (a) a line fit to a portion of the lane candidate in the near subregion and (b) a predetermined reference point in the road image is less than a neighborhood distance; and (iii) extending the true lane candidate into the far subregion to form a detected lane marker demarcating the lane marker.

BRIEF DESCRIPTION OF THE FIGURES

FIG. 5A shows a road image captured by the camera of FIG. 1. FIGS. 5B-5E show images processed from the road image of FIG. 5A by the lane detection system of FIG. 1.

DETAILED DESCRIPTION OF THE EMBODIMENTS

Figure 1:
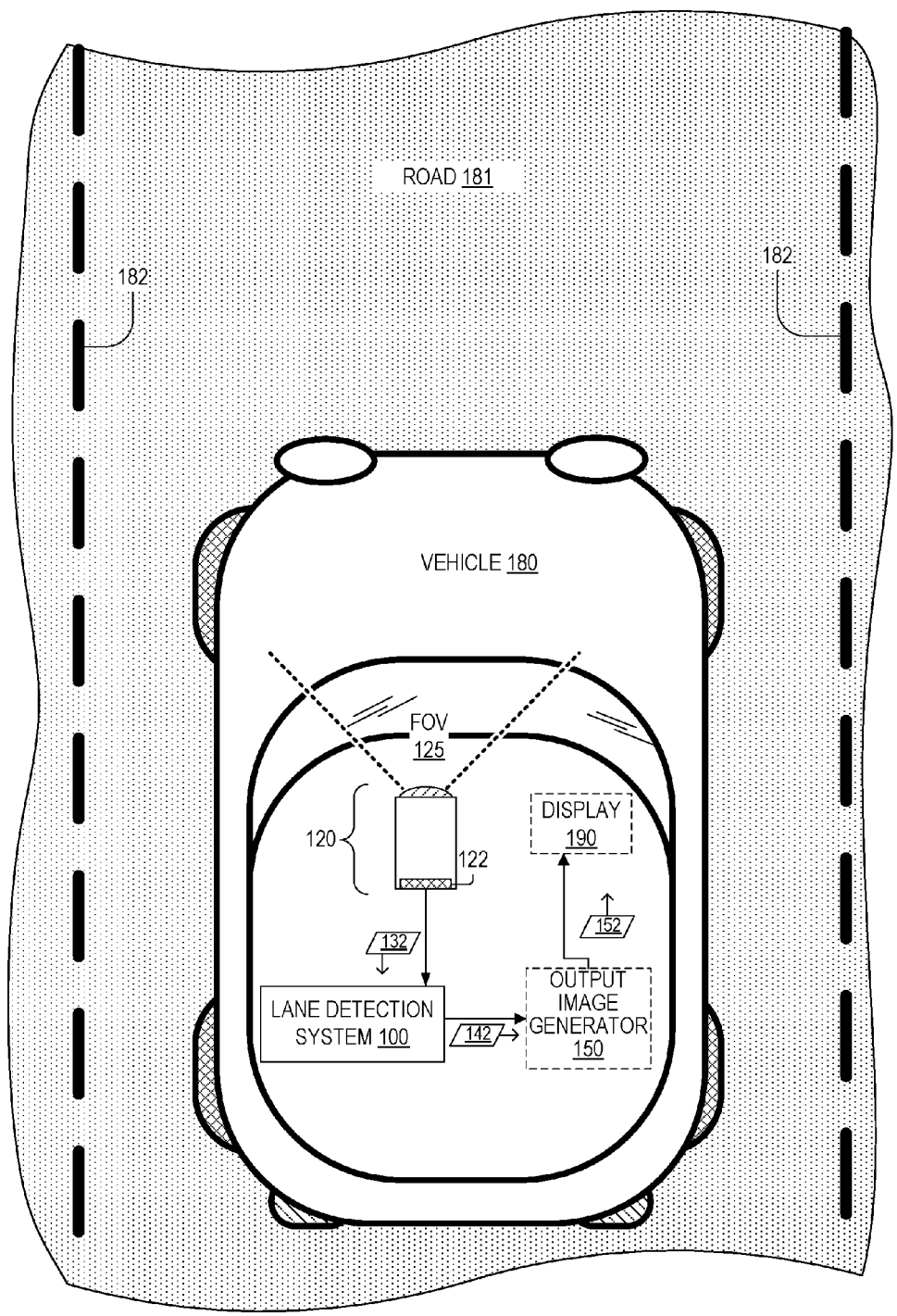
FIG. 1 is a plan view showing one exemplary lane detection system used within a vehicle equipped with a camera, in an embodiment.

FIG. 1 is a plan view showing one exemplary lane detection system 100 used within a vehicle 180. Vehicle 180 is on a road 181 that has lane markers 182. Lane detection system 100 includes an image processor 240. Vehicle 180 includes a camera 120 and optionally a display 190 communicatively coupled to lane detection system 100. Camera 120 includes an image sensor having a pixel array 122. In an embodiment, lane detection system 100 includes at least one of camera 120 and display 190.

Lane detection system 100 receives a road image 132 of a portion of road 181 within a field of view 125 of camera 120. Lane detection system 100 processes at least part of road image 132 to detect one or more lane markers 182 and generate a corresponding one or more detected lane markers 142. Detected lane markers 142 are for example one or more of an image demarcating lane markers 182 and an equation (or data set of coordinates) representable as a line or curve superimposable on road image 132.

In the example of FIG. 1, lane detection system 100 sends detected lane marker 142 to an output image generator 150 that generates an output image 152 for display on display 190. Output image generator 150 may generate output image 152 from road image 132 and detected lane marker 142. For example, output image 152 may be road image 132 with detected lane marker 142 superimposed thereon. In one embodiment, output image generator 150 is part of lane detection system 100.

Figure 2:
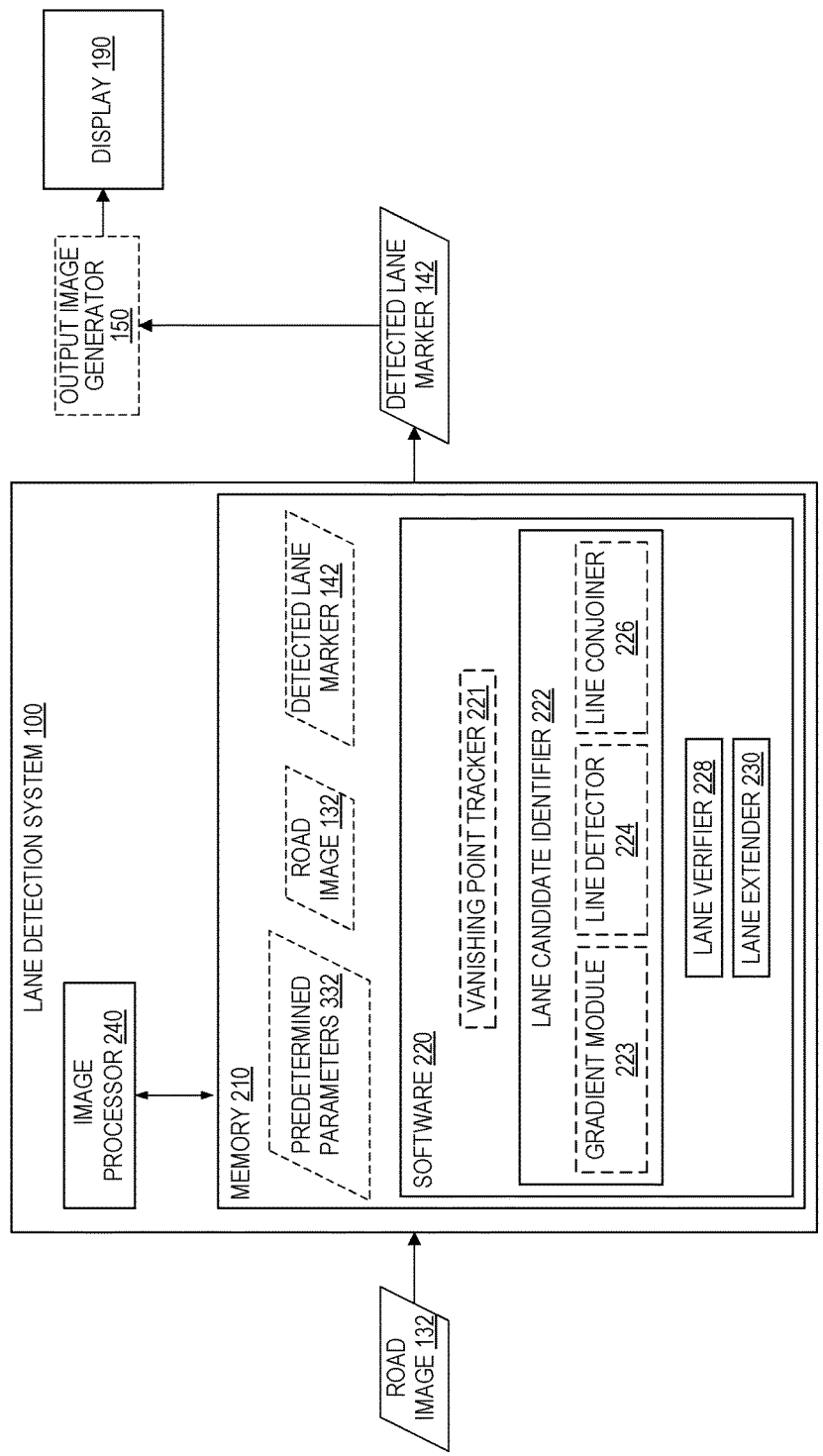
FIG. 2 shows the lane detection system of FIG. 1 in further exemplary detail, in an embodiment.

FIG. 2 shows lane detection system 100 in further exemplary detail. Lane detection system 100 includes an image processor 240 and memory 210 that stores software 220. Software 220 includes machine-readable instructions that, when executed by image processor 240, are capable of performing functions of lane detection system 100 as described herein. Software 220 includes the following software modules: a lane candidate identifier 222, a lane verifier 228, and a lane extender 230. Software 220 may also include a vanishing point tracker 221. Memory 210 is also shown storing one or both of road image 132, received from camera 120, and detected lane marker 142, generated by software 220.

Lane candidate identifier 222 includes machine-readable instructions that, when executed by image processor 240, operate to process road image 132 to identify one or more lane candidates within a lane-existing region of the road image. Lane candidate identifier 222 may include a gradient module 223, a line detector 224, and a line conjoiner 226.

Lane verifier 228 includes machine-readable instructions that, when executed by image processor 240, operate to verify the lane candidate identified by lane candidate identifier 222 as true lane candidates when a distance between (a) a line fit to a portion of the lane candidate and (b) a predetermined reference point in the road image is less than a neighborhood distance. Lane extender 230 includes machine-readable instructions that, when executed by image processor 240, operates to extend the true lane candidate, verified by lane verifier 228, toward a horizon line of road image 132 to form detected lane marker 142 demarcating lane marker 182.

Figure 3A:
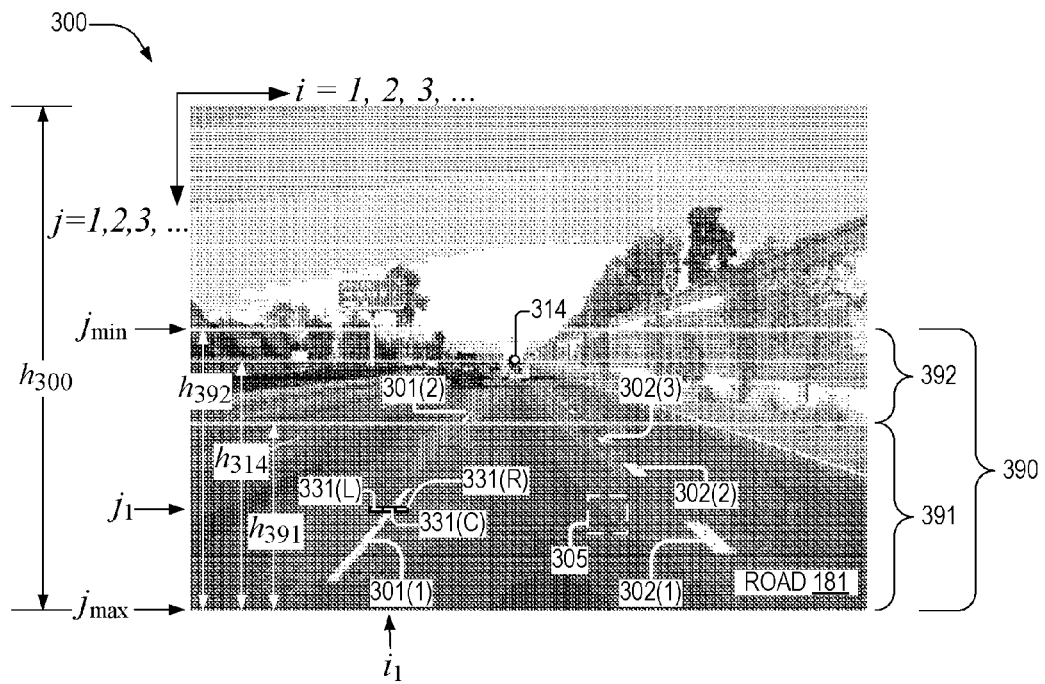
FIG. 3A shows an exemplary road image captured by the camera of FIG. 1.

FIG. 3A shows one exemplary road image 300 captured by camera 120 of FIG. 1. FIGS. 3B-9 show exemplary data processed from road image 300 by software 220 used to detect lane markings in road image 300. Road image 300 may represent road image 132 of FIG. 1. Road image 300 includes a lane-existing region 390 that is divided into a near subregion 391 and a far subregion 392. Lane-existing region 390 includes the bottom of road image 300. In other embodiments, lane-existing region 390 does not include the bottom of road image 300.

A predetermined reference point 314 within road image 300 may correspond to one or more of (a) a vanishing point and (b) a location on the horizon line of road image 300. Predetermined reference point 314 may correspond to a location on pixel array 122 (FIG. 1) determined when camera 120 is mounted on vehicle 180. The vertical location of predetermined reference point 314 in road image 300 may correspond to an angle within the vertical angle of view of camera 120, where the vertical angle of view is in a plane orthogonal to road 181.

In an embodiment, vanishing point tracker 221 adjusts the location of predetermined reference point 314 using a vanishing point tracking algorithm known in the art and one or more road images 132. Predetermined reference point 314 may be adjusted toward the top of road image 300, for example, when vehicle 180 approaches an uphill section of road 181. Lane-existing region 390 extends above reference point 314 such that when such an adjustment of reference point 314 occurs, reference point 314 remains within lane-existing region 390.

Road image 300 has a height $h_{300}$. With respect to the bottom of road image 300, near subregion 391 and far subregion 392 have heights $h_{391}$ and $h_{392}$ respectively. Similarly, reference point 314 is at a height $h_{314}$ above the bottom of road image 300. Lane detection system 100 computes $h_{391}$ as $h_{391}=\alpha h_{314}$ and $h_{392}$ as $h_{392}=h_{314}+\beta h_{300}$, where, for road image 300, $$\alpha = \frac{3}{4} \text{ and } \beta = \frac{1}{16}.$$

In the following example, road image 300 is quantitatively represented as a plurality of pixel values p(i,j) where coordinate (i,j) denotes a pixel column index and row index respectively as shown in FIG. 3A. A pixel (i,j) refers to a location in road image 300 at coordinate (i,j) having pixel value p(i,j). The following pixel-based discussion of road image 300 provides a background for exemplary operation of lane candidate identifier 222, and specifically how gradient module 223 identifies ridge features within road image 300, of which at least some become lane candidates.

Row indices $j_{max}$ and $j_{min}$ correspond to pixel rows at the bottom and top of lane-existing region 390, respectively. A pixel value p(i,j) is for example a grayscale pixel value such that each pixel value is an integer between zero and $2^N-1$, inclusive, where N is a positive integer.

Figure 3B:
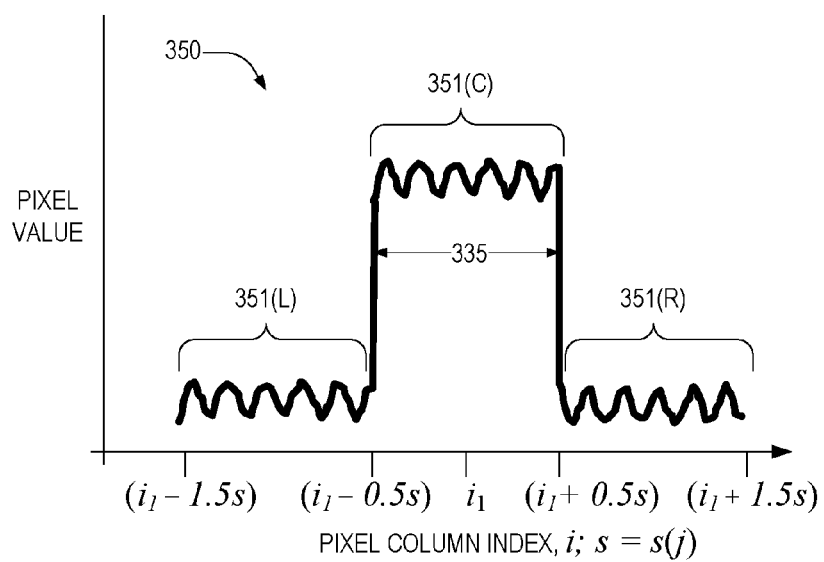
FIG. 3B shows a schematic pixel value cross-section of the road image of FIG. 3A along a horizontal patch.

Road image 300 shows lane markers 301(1, 2, ...) and 302(1, 2, ...), which correspond to lane markers 182 of road 181. For clarity of illustration, only lane markers 301(1-2) and 302(1-3) are labelled. FIG. 3B is a graph showing a schematic pixel value cross-section 350 of a portion of road image 300 at a pixel coordinate $(i_1,j_1)$ that is intersects lane marker 301(1). A horizontal patch 331 at pixel coordinate $(i_1,j_1)$ of road image 300 includes three sub-patches 331(L), 331(C), 331(R) corresponding to positions to the left of, on, and to the right of lane marker 301(1). Accordingly, pixel value cross-section 350 includes three sub-regions 351(L, C,R) corresponding to sub-patches 331(L,C,R) respectively.

Each sub-patch 331(L,C,R) (and corresponding sub-region 351(L,C,R) has a width 335 corresponding to a determined scale s(j) and a height of one pixel row, Scale s(j) is for example a number of pixel columns and may be an expected imaged width of lane marker 301 at row j in road image 300. Each lane marker 301 and 302 has an imaged lane-marker width (in road image 300) that depends on the lane marker's vertical position within road image 300 due to inherent perspective of road image 300. Thus, imaged lane markers appear widest at the bottom of lane-existing region 390 and narrowest at the top of lane-existing region 390. Accordingly, width 335 of horizontal patch 331(C) (and the value of scale $s(j_1)$) depends on the vertical position of horizontal patch 331 (represented by row index $j_1$) in road image 300.

Referring to lane detection system 100, gradient module 223 determines scale s(j). For example, gradient module 223 sets $s(j_{max})=20$, $s(j_{min})=1$, and determines the value of s(j) for $j_{min} \leq j \leq j_{max}$ by linearly interpolation between $s(j_{max})$ and $s(j_{min})$. Without departing from the scope hereof, sub-patches 331 may correspond to more than one pixel row, and sub-patches 331(L) and 331(R) may have widths that differ from the width of sub-patch 331(C).

Sub-regions 351(L,C,R) of intensity cross-section 350 (FIG. 3B) have average pixel values denoted as $\langle p_L(i_1,j_1)\rangle$, $\langle p_R(i_1,j_1)\rangle$, and $\langle p_R(i_1,j_1)\rangle$, respectively, which are, for example, computed as follows (evaluated at $(i,j)=(i_1,j_1)$), where s is an even integer: Average pixel value $\langle p_L(i,j)\rangle$ is the average of pixel values for pixels at row index j and in columns (i−1.5 s(j)) through (i−0.5 s(j)−1), inclusive. Average pixel value $\langle p_C(i,j)\rangle$ is the average of pixel values for pixels at row index j and in columns (i−0.5 s(j)) through (i+0.5 s(j)−1), inclusive. Average pixel value $\langle p_R(i,j)\rangle$ is the average of pixel values for pixels at row index j and in columns (i+0.5 s(j)) through (i+1.5 s(j)−1), inclusive.

Average pixel values $\langle p_L(i,j)\rangle$, $\langle p_C(i,j)\rangle$, and $\langle p_R(i,j)\rangle$ may be used to determine whether pixel location $(i_1,j_1)$ is a candidate ridge pixel. For example, pixel location $(i_1,j_1)$ is a candidate ridge pixel if two conditions (1) and (2) are satisfied, where ρ·Δ is a pre-defined weak threshold that guarantees the majority of lane pixels can be successfully classified as candidate ridge pixels. The quantity ρ is a weak factor, for example ρ=0.15.

The quantity Δ is a contrast value representative of a typical difference between (a) pixel values $p_L$ of pixels in a road image corresponding to a lane marker and (b) pixel values $p_{NL}$ of pixels in the road image corresponding to a portion of the road that is not a lane marker. For example, Δ=

$\langle p_L \rangle - \langle p_{NL} \rangle$, which may result in $\Delta=130$ when the upper limit of $\Delta$ is 255. In road image 300, examples of pixel values $p_L$ include pixel values within in lane markers 301 and 302, and examples of pixel values $p_{NL}$ include pixel values within an inter-marker region 305. In conditions (1) and (2), gradientLeft and gradientRight are horizontal image gradients computable by gradient module 223.

$$\text{gradientLeft:} \langle p_C(i,j) \rangle - \langle p_L(i,j) \rangle \geq \rho \cdot \Delta \quad (1)$$

$$\text{gradientRight:} \langle p_C(i,j) \rangle - \langle p_R(i,j) \rangle \geq \rho \cdot \Delta \quad (2)$$

In an embodiment, quantities $\rho$ and $\Delta$ are predetermined empirically based on representative road images and stored in memory 210 of lane detection system 100 as predetermined parameters 332. Predetermined parameters 332 may include at least one of $\rho$ and $\Delta$, and product $\rho \cdot \Delta$. Predetermined parameters 332 may also include several values of $\Delta$ representative of roads in different conditions that affect visibility such as rain, fog, ice, snow, glare, ambient light level, and lane-marker color.

Figure 4A:
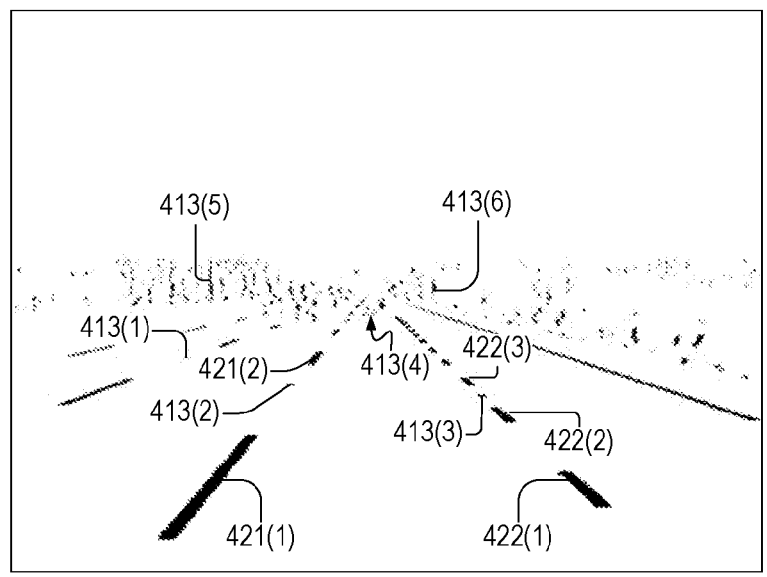
FIGS. 4A and 4B show exemplary ridge-feature images processed from the road image of FIG. 3A by the lane detection system of FIG. 1.
Figure 4B:
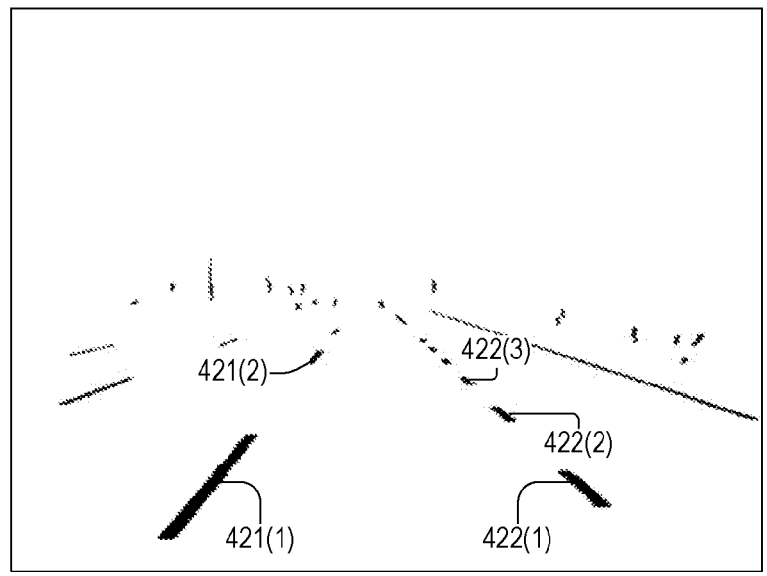

Gradient module 223 evaluates conditions (1) and (2) at a plurality of pixel coordinates (i,j) within road image 300, which results in a ridge-feature image 400 shown in FIG. 4A. The plurality of pixel coordinates correspond for example to coordinates within lane-existing region 390. A pixel value p(i,j) in ridge-feature image 400 is one of two values (for example one and zero) depending on whether a horizontal patch associated with pixel coordinate (i,j) of road image 300 satisfies conditions (1) and (2), where threshold $\rho$ equals 0.15. A ridge feature is a plurality of contiguous candidate ridge pixels that may correspond to a lane marker in road image 300. Ridge-feature image 400 includes ridge features 421(1,2) and 422(1-3) that correspond to lane markers 301(1,2) and 302(1-3) of road image 300.

Ridge-feature image 400 may also include false ridge-features, such as false ridge-features 413(1-6), which do not correspond to a lane marker of road image 300. Incidence of false ridge-features increases as the value of $\rho \cdot \Delta$ decreases. In an embodiment, lane candidate identifier 222 refines ridge-feature image 400 to eliminate false ridge-features, such as 413(1-4), to yield a refined-ridge-feature image 450 shown in FIG. 4B. Refined-ridge-feature image 450 results from a continuity threshold operation, executed by lane candidate identifier 222 for example, to ridge-feature image 400. The continuity threshold operation removes candidate ridge pixels from ridge-feature image 400 that are not part of a contiguous group of M candidate ridge pixels where M≥k, where k is an integer continuity threshold value. For example, k=8 in refined-ridge-feature image 450. Two contiguous pixels may be adjacent in one of a horizontal, vertical, or diagonal direction with respect to pixel rows and columns.

FIGS. 5A-5C show a road image 500, a ridge-feature image 510 formed from road image 500, a refined-ridge-feature image 520 refined from ridge-feature image 510. Road image 500 is an example of road image 132, and includes a section of road 181 that includes lane markers 501-504 and a lane-existing region 590(0), which includes a near subregion 591 and a far subregion 592. Refined-ridge-feature image 520 results from a continuity threshold operation, executed by lane candidate identifier 222 for example, to ridge-feature image 510. Ridge-feature image 510 and refined-ridge-feature image 520 include ridge features 521-524 that correspond to lane markers 501-504 respectively. Referring to lane detection system 100, ridge features 521-524 are exemplary output of gradient module 223 as executed by image processor 240 using a process similar to the process used to identify ridge features 421 and 422.

FIG. 5D is a fitted ridge-feature image 530 derived from refined ridge-feature image 520. Fitted ridge-feature image 530 includes line groups 531-534 that each at least partially overlaps ridge features 521-524, respectively. Referring to lane detection system 100, line detector 224 identifies line groups 531-534. Each line group 531-534 includes a plurality of lines 531(1-$m_1$), 532(1-$m_2$), 533(1-$m_3$), and 534(1-$m_4$), respectively. For example, FIG. 5E is a magnified view 540 of a portion of line group 532 the shows lines 532(1-8).

Refined-ridge-feature image 520 includes a lane-existing region 590(2). In an embodiment, fitted ridge-feature image 530 results from line detector 224 applying a Hough transform to lane-existing region 590(2) of refined-ridge-feature image 520. Alternatively, fitted ridge-feature image 530 may result from line detector 224 applying a Hough transform to lane-existing region 590(1) of ridge-feature image 510. A feature extraction technique other than a Hough transform may be used to generate fitted ridge-feature image 530 from either ridge-feature images 510 and 520.

Each lane-existing region 590(0,1,2) refers to a lane-existing region of images 500, 510, and 520, respectively. Since images 510 and 520 are processed versions of road image 500, lane-existing regions 590(1,2) are also considered herein as corresponding to lane-existing region 590(0), where the parenthetical index designates an associated image.

Figure 6:
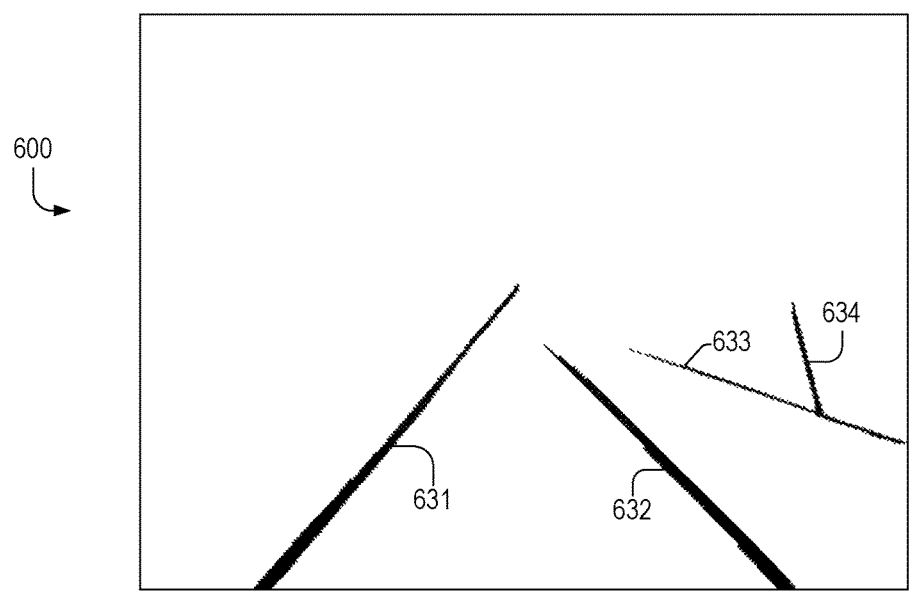
FIG. 6 shows a lane-candidate image generated from the image of FIG. 5D by the lane detection system of FIG. 1.

Line groups 531-534 may be each conjoined, by line conjoiner 226 for example, into lane candidates 631-634 respectively, as shown in a lane-candidate image 600, FIG. 6. In an embodiment, line conjoiner 226 applies a morphological operator may to line groups 531-534 to generate lane candidates 631-634, respectively.

Figure 7:
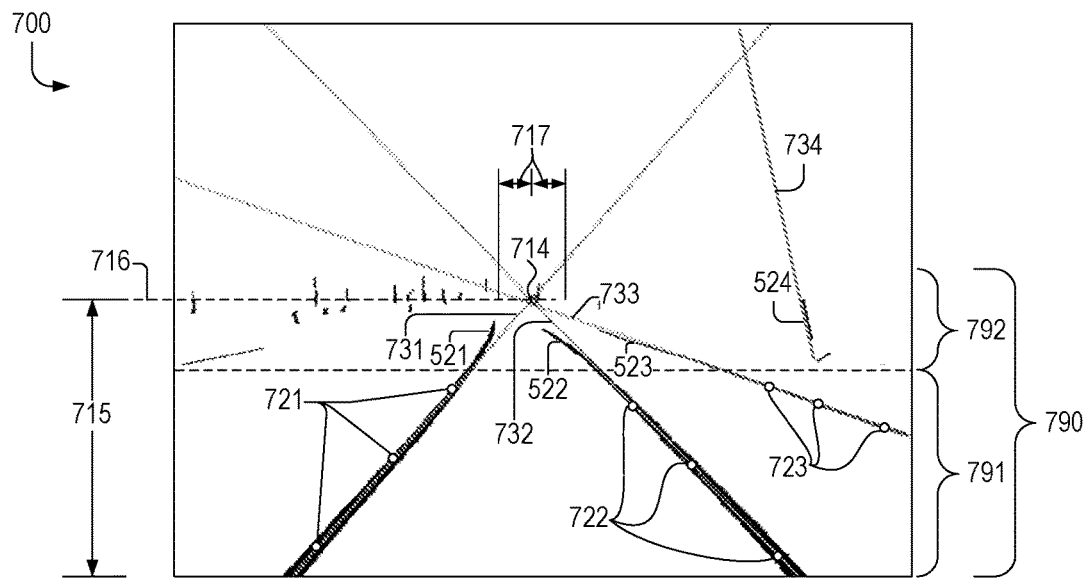
FIG. 7 is a true-lane-candidate image formed from the image of FIG. 5C and the lane-candidate image of FIG. 6.

FIG. 7 is a true-lane-candidate image 700 formed from refined-ridge-feature image 520 and lane-candidate image 600. True-lane-candidate image 700 is for example generated by lane verifier 228 of lane detection system 100. True-lane-candidate image 700 includes a predetermined reference point 714 located at a height 715 from the bottom of true-lane-candidate image 700 indicated by horizon line 716 superimposed thereon. Predetermined reference point 714, which may correspond to one or more of (a) a vanishing point and (b) a location on the horizon line of road image 500.

True-lane-candidate image 700 includes ridge features 521-524 and corresponding linear ridge extensions 731-734 respectively. Linear ridge extensions 731-733 each intersect horizon line 716 less than a neighborhood distance 717 from predetermined reference point 714, which qualifies ridge features 521-523 as true lane candidates. Neighborhood distance 717 is a distance within true-lane-candidate image 700. Referring to lane detection system 100, lane verifier 228 generates linear ridge extensions 731-734 and verifies ridge features 521-523 as true lane candidates. Lane verifier 228 may also disqualify ridge feature 524 from being a true lane candidate.

Ridge feature 524 does not qualify as a true lane candidate because its line ridge extension 734 intersects horizon line 716 at a distance from predetermined reference point 714 that exceeds neighborhood distance 717. Neighborhood distance 717 need not be a distance from reference point 714 on horizon line 716. For example, neighborhood distance 717 may be a maximum allowable value of a minimum distance (that is, a perpendicular distance) between a linear ridge extension and predetermined reference point 714.

True-lane-candidate image 700 includes a lane-existing region 790, which includes a near subregion 791 and a far subregion 792. Regions 790, 791, and 792 correspond to regions 590(0), 591, and 592, respectively, of road image 500. Linear ridge extensions 731-734 are formed by fitting a line to a plurality of near control points, within near subregion 791, in each ridge feature 521-524 respectively. Ridge features 521-523 have near control points 721-723, respectively. Linear ridge extensions 731-733 are lines fit, for example by lane verifier 228, to near control points 721-723, respectively. Ridge extensions 731-733 may be non-linear fit to control points 721-723, respectively, without departing from the scope hereof.

Near control points 721-723 correspond to locations in at least one of ridge-feature image 510 and refined-ridge-feature image 520. In an embodiment, lane verifier 228 determines control points 721-723 by searching for control points within ridge-feature image 510 or 520 using a point in lane candidates 631-633 respectively as a starting point for searching for control points. In this sense, lane candidates 631-633 function as seed lanes.

Figure 8:
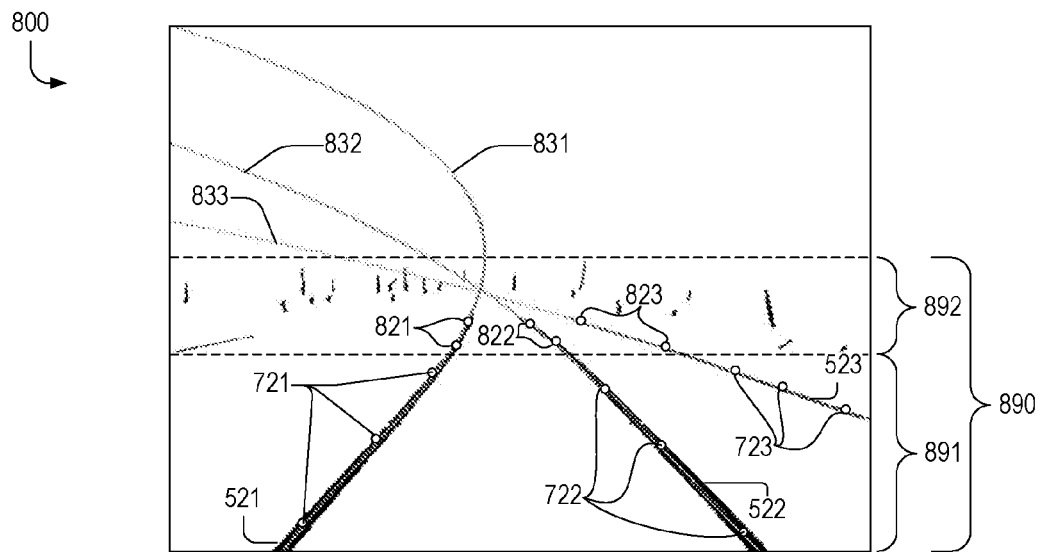
FIG. 8 is an extended-lane image formed by the lane detection system of FIG. 1, which extends true lane candidates of the true-lane-candidate image FIG. 7.

FIG. 8 is an extended-lane image 800 formed by extending true lane candidates, ridge features 521-524, determined by the linear ridge extensions 731-733 of true-lane-candidate image 700. Extended-lane image 800 includes a lane-existing region 890, which includes a near subregion 891 and a far subregion 892. Regions 890-892 correspond to regions 790-792, respectively, of lane-candidate image 700. Referring to lane detection system 100, lane extender 230 extends ridge features 521-523 into far subregion 892 of extended-lane image 800.

Extended-lane image 800 includes fitted curves 831-833, which correspond to ridge features 521-523, respectively. In an embodiment, lane extender 230 generates each fitted curve 831-833 by fitting a non-linear curve to near control points in near subregion 891 and a far control point in far subregion 892. Ridge features 521-523 have far control points 821-823, respectively. Fitted curve 831 is a polynomial curve fit to near control points 721 and far control points 821. Fitted curve 832 is a polynomial curve fit to near control points 722 and far control points 822. Fitted curve 833 is a polynomial curve fit to near control points 723 and far control points 823. Referring to lane detection system 100, lane extender 230 identifies far control points 821-823 corresponding to ridge features 521-523 respectively.

In an embodiment, lane extender 230 generates one or more fitted curves 831-833 by employing at least one of a linear fit, a polynomial curve fit, and a non-linear curve fit of near control points and far control points of respective ridge features 521-523. The location of a control point, such as near control points 721-723 and far control points 821-823, may correspond to a pixel coordinate a road image or to location in the road image between adjacent pixels, such as an interpolated position between a plurality of pixel coordinates.

Extended-lane image 800 is processed from road image 500 by lane detection system 100 of vehicle 180. Road image 500 may be considered to be the first road image 500(1) of a series of road images 500(1,2, . . . N) captured by camera 120 as vehicle 180 proceeds along road 181. Control points 721-723 and 821-823 maybe designated as 721(1)-723(1) and 821(1)-823(1). In a subsequent road image, designated as 500(2) for example (not shown), at least portion of far control points 821(1)-823(1) move into near subregion 891 and may be reassigned as near control points 721(2)-723(2), and be fit by a line. Alternatively, near control points 721(2)-723(2) of road image 500(2) may be determined independently of far control points 821(1)-823(1) of previous image 500(1).

Figure 9:
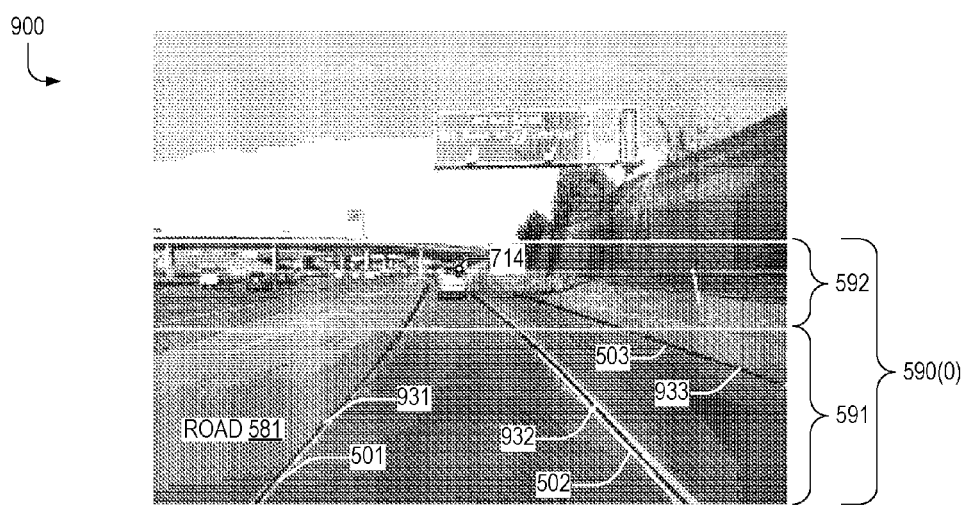
FIG. 9 shows detected lane markers superimposed, by the lane detection system of FIG. 1, on lane markers of the road image of FIG. 5A.

FIG. 9 is a road image 900 showing detected lane markers 931-933 (black) superimposed on lane markers 501-503 (white), respectively, within lane-existing region 590(0) of a road 581. Detected lane markers 931-933 are portions of fitted curves 831-833 respectively beneath predetermined reference point 714. Referring to lane detection system 100, lane extender 230 generates detected lane markers 931-933, which are each examples of one detected lane marker 142. Road image 900 may be viewed on display 190.

Figure 10:
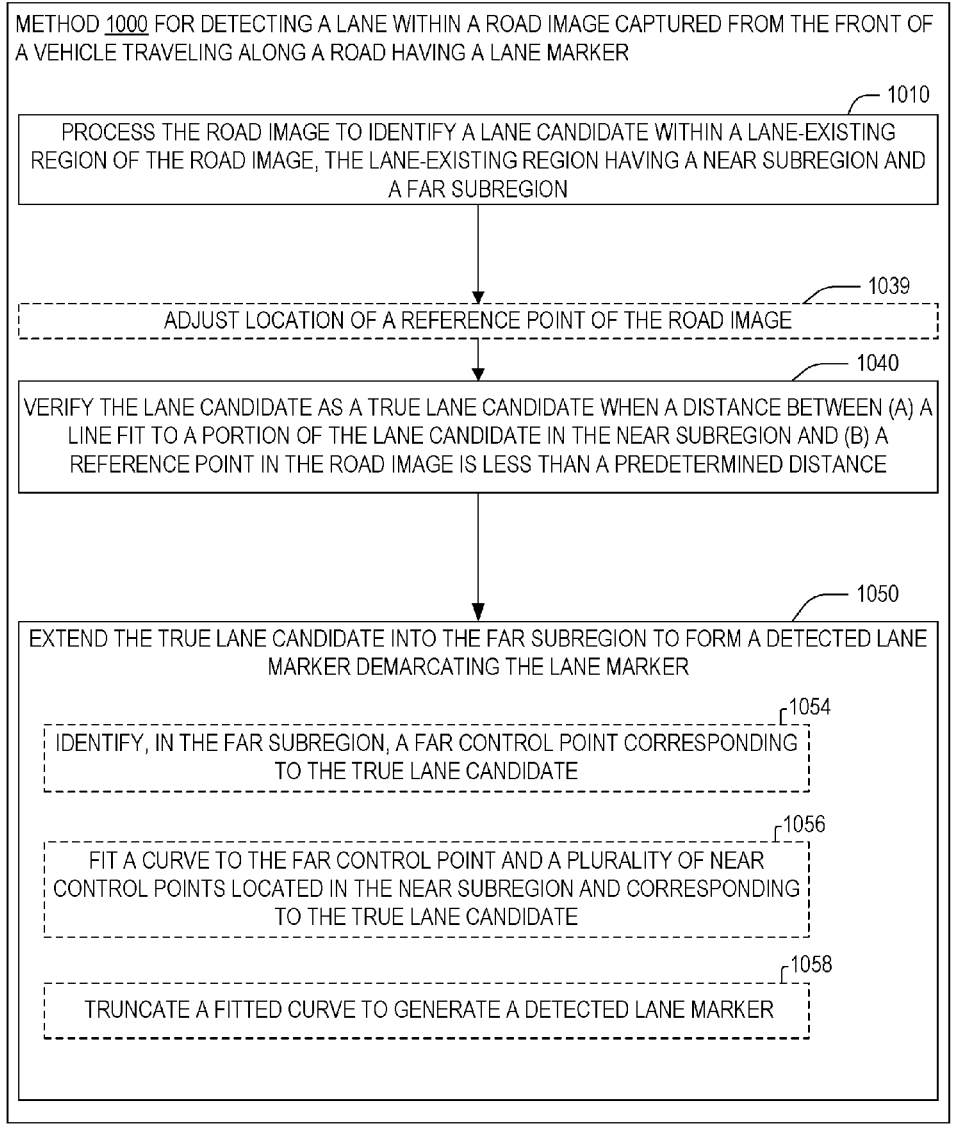
FIG. 10 is a flowchart illustrating one exemplary method for detecting a lane within a road image, in an embodiment.

FIG. 10 is a flowchart illustrating an exemplary method 1000 for detecting a lane within a road image captured from the front of a vehicle traveling along a road having a lane marker. FIGS. 2-9 show road images and processed road images corresponding to steps of method 1000. FIGS. 2-10 are best viewed together in the following description. Method 1000 is implemented by software 220 of lane detection system 100, for example.

In step 1010, method 1000 processes the road image to identify a lane candidate within a lane-existing region of the road image, the lane-existing region having a near subregion and a far subregion including, respectively, imaged road regions nearer to the vehicle, and imaged road regions farther from the vehicle. In an example of step 1010, lane candidate identifier 222 identifies lane candidates 631-634 of lane-candidate image 600. Applicant notes that method 1000, and step 1010 in particular, requires neither pre-processing steps such as denoising and feature enhancement, or an inverse perspective transform, to identify lane candidates.

Method 1000 may include optional step 1039. If included, in step 1039, method 1000 adjusts the location of a predetermined reference point in the road image. In an example of step 1039, vanishing point tracker 221 adjusts the location of predetermined reference point 314 within road image 300.

In step 1040, method 1000 verifies the lane candidate as a true lane candidate when a distance between (a) a line fit to a portion of the lane candidate in the near subregion and (b) a predetermined reference point in the road image is less than a neighborhood distance. In an example of step 1040, lane verifier 228 verifies ridge features 521-523 as true lane candidates, as shown in FIG. 7.

In step 1050, method 1000 extends the true lane candidate into the far subregion to form a detected lane marker demarcating the lane marker. In an example of step 1050, lane extender 230 extends ridge features 521-523 into far subregion 892 of extended-lane image 800.

Step 1050 optionally includes steps 1054, 1056, and 1058. If included, in step 1054, method 1000 identifies, in the far subregion, a far control point corresponding to the true lane candidate. In an example of step 1054, lane extender 230 identifies far control points 821-823 corresponding to ridge features 521-523 respectively, as shown in FIG. 8.

If included, in step 1056, method 1000 fits a curve to the far control point and a plurality of near control points located in the near subregion and corresponding to the true lane candidate. In an example of step 1056, lane extender 230 fits (i) fitted curve 831 to near control points 721 and far control points 821, (ii) fitted curve 832 to near control points 722 and far control points 822, and (iii) fitted curve 833 to near control points 723 and far control points 823.

If included, in step 1058, method 1000 truncates a fitted curve to generate a detected lane marker. In an example of step 1058, lane extender 230 truncates fitted curves 831-833 to generate detected lane markers 931-933 respectively.

Figure 11:
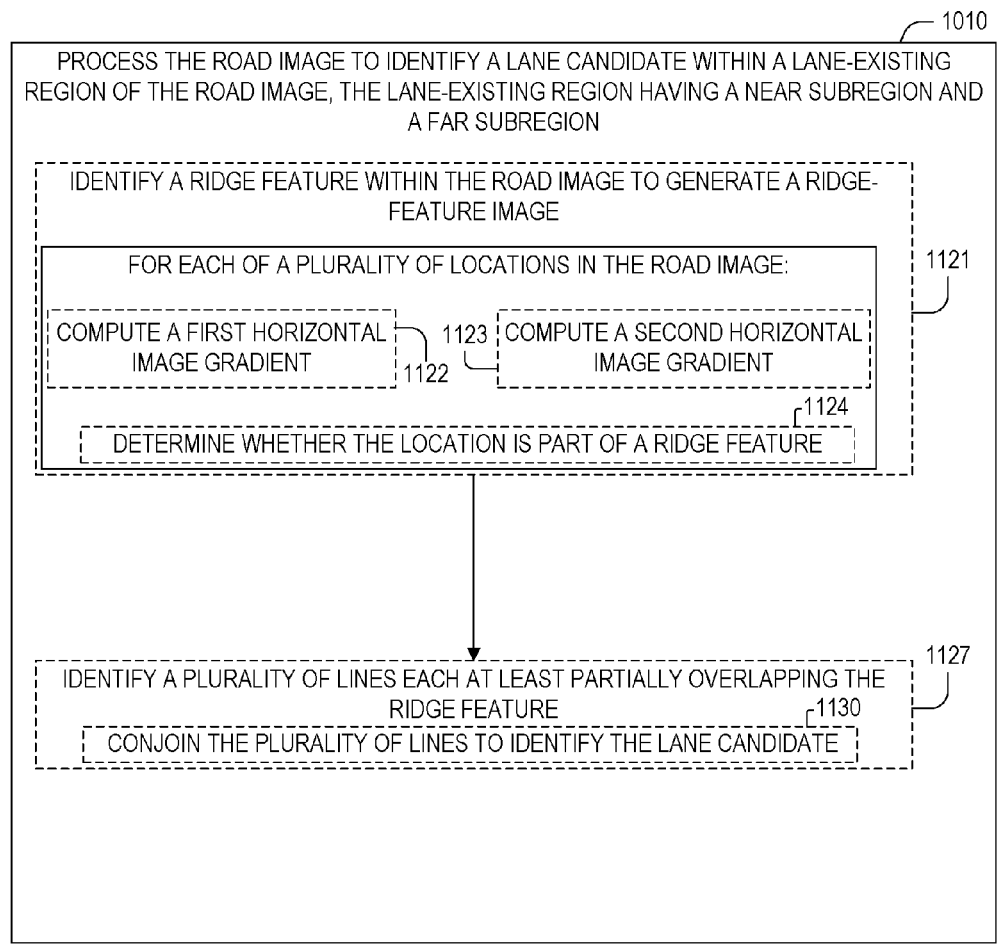
FIG. 11 is a flowchart illustrating further exemplary detail of the road-image-processing step of FIG. 10, in an embodiment

Step 1010 may include steps 1121 and 1127, shown in FIG. 11. If included, in step 1121, method 1000 identifies a ridge feature within the road image to generate a ridge-feature image. In an example of step 1121, lane candidate identifier 222 identifies ridge features 421 and 422 within road image 300 to generate ridge-feature image 400 shown in FIG. 4.

Step 1121 may include steps 1022-1024. If included, in step 1122, method 1000 computes, for each of a plurality of locations of the road image, a first horizontal image gradient partially based on a first image intensity representative of a first image region entirely to the left of the location. If included, in step 1123, method 1000 computes, for each of a plurality of locations of the road image, a second horizontal image gradient partially based on a second image intensity representative of a second image region entirely to the right of the location. For a given location in the road image, the first and second horizontal image gradient is also based on a central image intensity representative of a central image region that includes the location.

In an example of steps 1122 and 1123, gradient module 223 computes gradientLeft and gradientRight of conditions (1) and (2) associated with sub-regions 351(L,C,R) (pixel location $(i_1,j_1)$) of horizontal patch 331(L,C,R) of road image 300, FIG. 3A.

If included, in step 1124, method 1000 determines whether the location is part of a ridge feature based on the first horizontal image gradient and the second horizontal image gradient. In an example of step 1124, gradient module 223 determines if pixel location $(i_1,j_1)$ in road image 300 is a candidate ridge pixel according to whether conditions (1) and (2) are satisfied.

In step 1127, method 1000 identifies a plurality of lines each at least partially overlapping the ridge feature. In an example of step 1127, line detector 224 identifies line groups 531-534 of fitted ridge-feature image 530 (FIG. 5D), which at least partially overlap ridge features 521-524 respectively.

Step 1127 optionally includes step 1130. In step 1130, method 1000 conjoins the plurality of lines to identify a lane candidate. In an example of step 1130, line conjoiner 226 conjoins each line group 531-534 resulting in lane candidates 631-634 respectively, as shown in FIG. 6. Applicant notes that method 1000, and step 1127 in particular, does not require time-consuming computations such as data traversal, appending, and deletion.

Figure 12:
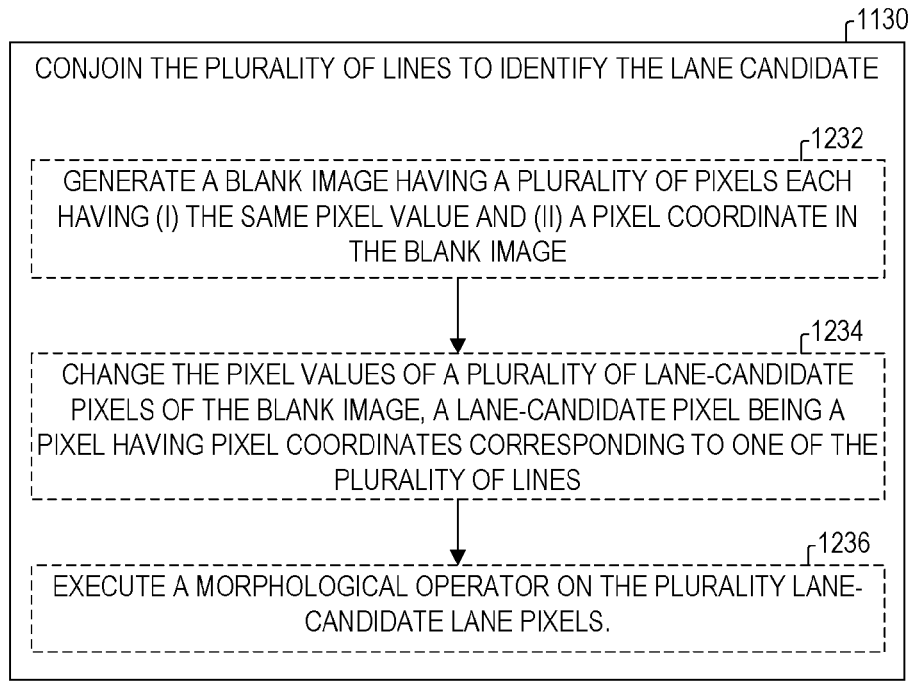
FIG. 12 is a flowchart illustrating further exemplary detail of the conjoining step of FIG. 11, in an embodiment.

In an embodiment of method 1000, step 1130 includes steps 1234 and 1236, as shown in FIG. 12. Step 1234 pertains to a blank image having a plurality of pixels each having (i) the same pixel value and (ii) a pixel coordinate in the blank image. The blank image is for example visually equivalent to lane-candidate image 600 with lane candidates 631-634 removed. Quantitatively, a blank image may be a two-dimensional array of numbers stored as an array data type within memory 210 of lane detection system 100, where each array element has the same value, e.g. zero. The two-dimensional array may be displayed as an image, such that each array element (identified by two indices for example) is a pixel, and the array element's value is a pixel value.

If included, in step 1234, method 1000 changes the pixel values of a plurality of lane-candidate pixels of the blank image, a lane-candidate pixel being a pixel with pixel coordinates corresponding to one of the plurality of lines identified in step 1127 (FIG. 11). In an example of step 1234 line conjoiner 226 produces an image that visually resembles image 530. Step 1130 may also include step 1232, in which method 1000 generates the blank image.

If included, in step 1236, method 1000 executes a morphological operator on the plurality lane-candidate pixels. In an example of step 1236, line conjoiner 226 executes a morphological operator that conjoins the plurality lane-candidate pixels into lane candidates 631-634. The morphological operator is for example a closing operator.

Combinations of Features.

Features described above as well as those claimed below may be combined in various ways without departing from the scope hereof. The following examples illustrate some possible, non-limiting combinations:

(A1) A method detects a lane within a road image captured from the front of a vehicle traveling along a road having a lane marker. The method includes processing the road image to identify a lane candidate within a lane-existing region of the road image. The lane-existing region has (a) a near subregion that includes an imaged road region nearer to the vehicle and (b) a far subregion that includes an imaged road region farther from the vehicle. The method also includes verifying the lane candidate as a true lane candidate when a minimum distance between (a) a line fit to a portion of the lane candidate in the near subregion and (b) a predetermined reference point in the road image is less than a neighborhood distance. The method also includes extending the true lane candidate into the far subregion to form a detected lane marker demarcating the lane marker.

(A2) In the method denoted as (A1), the step of processing may include steps of (a) identifying a ridge feature within the road image to generate a ridge-feature image, and (b) identifying a plurality of lines each at least partially overlapping the ridge feature.

(A3) The method denoted as (A2) may further include a step of conjoining the plurality of lines to identify the lane candidate.

(A4) In a method denoted by one of (A2) and (A3), the step of conjoining may include, in a blank image having a plurality of pixels each having (i) the same pixel value and (ii) a pixel coordinate in the blank image, steps of: (a) changing the pixel values of a plurality of lane-candidate pixels, a lane-candidate pixel being a pixel having pixel coordinates corresponding to one of the plurality of lines, and (b) executing a morphological operator on the plurality lane-candidate lane pixels.

(A5) In a method denoted by one of (A2) though (A4), the step of identifying a ridge feature may include, for each of a plurality of locations of the road image, steps of (a) computing a first horizontal image gradient partially based on a first image intensity representative of a first image region entirely to the left of the location, (b) computing a second horizontal image gradient partially based on a second image intensity representative of a second image region entirely to the right of the location; and (c) determining whether the location is part of a ridge feature based on the first horizontal image gradient and the second horizontal image gradient.

(A6) A method denoted by (A5) may further include a step of determining, based on a vertical position of the location, a horizontal width of at least one of (a) the first image region, (b) the second image region, and (c) the ridge feature.

(A7) A method denoted by one of (A5) and (A6) may further include a step of applying a continuity threshold operation to the ridge feature image to disqualify ridge features not corresponding to a lane marker.

(A8) In a method denoted by (A7), each ridge feature may be formed of a plurality of candidate ridge pixels, the continuity threshold operation having a threshold according to a minimum number of spatially-connected candidate ridge pixels in each candidate ridge feature.

(A9) In a method denoted by one of (A2) through (A8), one of the plurality of lines may be fit to a plurality of near control points in the ridge-feature image corresponding to the lane candidate, the near control points being in a second near subregion of the ridge-feature image corresponding to the near subregion of the road image.

(A10) In a method denoted by one of (A1) through (A9), the step of extending may further include, for each true lane candidate: (a) identifying, in the far subregion, a far control point corresponding to the true lane candidate, and (b) fitting a curve to the far control point and a plurality of near control points located in the near subregion and corresponding to the true lane candidate.

(B1) A lane detection system detects a lane within a road image captured along a road having a lane marker. The lane detection system includes a non-volatile memory storing machine-readable instructions and an image processor capable of receiving the road image. The image processor, when executing the machine-readable instructions, is capable of: (i) processing the road image to identify a lane candidate within a lane-existing region of the road image, the lane-existing region having (a) a near subregion including an imaged road region nearer to the vehicle and (b) a far subregion including an imaged road region farther from the vehicle, (ii) verifying the lane candidate as a true lane candidate when a distance between (a) a line fit to a portion of the lane candidate in the near subregion and (b) a predetermined reference point in the road image is less than a neighborhood distance; and (iii) extending the true lane candidate into the far subregion to form a detected lane marker demarcating the lane marker.

(B2) In a lane detection system denoted by (B1), the image processor may be further capable of, when executing the machine-readable instructions to process the road image: (a) identifying a ridge feature within the road image to generate a ridge-feature image, and (b) identifying, within the ridge-feature image, a plurality of lines each at least partially overlapping the ridge feature.

(B3) In a lane detection system denoted by (B2), the image processor may further be capable of, when executing the machine-readable instructions, conjoining the plurality of lines to identify the lane candidate (B4) In a lane detection system denoted by (B3), the image processor may be further capable of, when executing the machine-readable instructions to conjoin the plurality of lines: executing a morphological operator on the plurality of lines to form the lane candidate.

(B5) In a lane detection system denoted by one of (B2) through (B4), image processor may be further capable of, when executing the machine-readable instructions to identify a ridge feature: (a) computing a first horizontal image gradient partially based on a first image intensity representative of a first image region entirely to the left of the location, (b) computing a second horizontal image gradient partially based on a second image intensity representative of a second image region entirely to the right of the location, and (c) determining whether the location is part of a ridge feature based on the first horizontal image gradient and the second horizontal image gradient.

(B6) In a lane detection system denoted by (B5) the image processor may be further capable of, when executing the machine-readable instructions, determining, based on a vertical position of the location, a horizontal width of at least one of (a) the first image region, (b) the second image region, and (c) the ridge feature.

(B7) In a lane detection system denoted by one of (B5) and (B6), the image processor may be further capable of, when executing the machine-readable instructions, applying a continuity threshold operation to the ridge feature image to disqualify ridge features not corresponding to a lane marker.

(B8) In a lane detection system denoted by (B7), each ridge feature may be formed of a plurality of candidate ridge pixels, the continuity threshold operation having a threshold according to a minimum number of spatially-connected candidate ridge pixels in each candidate ridge feature.

(B9) In a lane detection system denoted by one of (B2) through (B8), one of the plurality of lines may be fit to a plurality of near control points in the ridge-feature image corresponding to the lane candidate, the near control points being in a second near subregion of the ridge-feature image corresponding to the near subregion of the road image.

(B10) In a lane detection system denoted by one of (B2) through (B9), the predetermined reference point in the road image may be a vanishing point of the road image.

(B11) In a lane detection system denoted by one of (B1) through (B10), the image processor may be further capable of, when executing the machine-readable instructions to extend the true lane candidate: (a) identifying, in the far subregion, a far control point corresponding to the true lane candidate; and (b) fitting a curve to the far control point and a plurality of near control points located in the near subregion and corresponding to the true lane candidate.

(B12) In a lane detection system denoted by (B11), the far control point may be adjacent to a pixel of the true lane candidate in the near subregion.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for detecting a lane within a road image captured by a camera having a field of view in front of a vehicle traveling along a road having a lane marker, comprising the steps of:
 identifying, within the road image, a reference point located at a reference-point height, with respect to the bottom of the road image, determined by an angle-of-view of the camera in a plane orthogonal to the road;
 adjusting the reference-point height according to a location of a vanishing point in the road image to obtain an adjusted reference-point height;
 determining a first height as a first fraction of the adjusted reference-point height;
 determining a second height equal to a sum of the adjusted reference point height and a second fraction of a height of the road image, each of the first fraction and second fraction being positive and less than one;
 processing the road image to identify a lane candidate within a lane-existing region of the road image, the lane-existing region having (i) a first subregion having the first height with respect to the bottom of the road image, (ii) a second subregion having the second height with respect to the bottom of the road image, and (iii) the reference point;
 verifying the lane candidate as a true lane candidate when a minimum distance between (a) a line fit to a portion of the lane candidate in the first subregion and (b) the predetermined reference point is less than a neighborhood distance; and extending the true lane candidate into the second subregion to form a detected lane marker demarcating the lane marker.

2. The method of claim 1, the step of processing comprising:

identifying a ridge feature within the road image to generate a ridge-feature image; and identifying, within the ridge-feature image, a plurality of lines each at least partially overlapping the ridge feature.

3. The method of claim 2, the plurality of lines being mutually non-collinear, and further comprising conjoining the plurality of lines to identify the lane candidate.

4. The method of claim 3, the step of conjoining comprising, in a blank image having a plurality of pixels each having (i) the same pixel value and (ii) a pixel coordinate in the blank image:

changing the pixel values of a plurality of lane-candidate pixels, a lane-candidate pixel being a pixel having pixel coordinates corresponding to one of the plurality of lines;

executing a morphological operator on the plurality lane-candidate lane pixels.

5. The method of claim 2, the step of identifying a ridge feature comprising:

for each of a plurality of locations of the road image:
computing a first horizontal image gradient partially based on a first image intensity representative of a first image region entirely to the left of the location;
computing a second horizontal image gradient partially based on a second image intensity representative of a second image region entirely to the right of the location; and
determining whether the location is part of a ridge feature based on the first horizontal image gradient and the second horizontal image gradient.

6. The method of claim 5, further comprising determining, based on a vertical position of the location, a horizontal width of at least one of (a) the first image region, (b) the second image region, and (c) the ridge feature.

7. The method of claim 5, further comprising applying a continuity threshold operation to the ridge feature image to disqualify ridge features not corresponding to a lane marker.

8. The method of claim 7, each ridge feature being formed of a plurality of candidate ridge pixels, the continuity threshold operation having a threshold according to a minimum number of spatially-connected candidate ridge pixels in each candidate ridge feature.

9. The method of claim 2, one of the plurality of lines being fit to a plurality of near control points in the ridge-feature image corresponding to the lane candidate, the near control points being in a near subregion of the ridge-feature image corresponding to the first subregion of the road image.

10. The method of claim 1, the step of extending further comprising, for each true lane candidate, identifying, in the second subregion, a far control point corresponding to the true lane candidate; and fitting a curve to the far control point and a plurality of near control points located in the first subregion and corresponding to the true lane candidate.

11. A lane detection system for detecting a lane within a road image captured along a road having a lane marker comprising:

a non-volatile memory storing machine-readable instructions; and an image processor communicatively coupled to the memory, capable of receiving the road image; and, when executing the machine-readable instructions, capable of:

identifying, within the road image, a reference point located at a reference-point height, with respect to the bottom of the road image, determined by an angle-of-view of the camera in a plane orthogonal to the road;

adjusting the reference-point height according to a location of a vanishing point in the road image to obtain an adjusted reference-point height;

determining a first height as a first fraction of the adjusted reference-point height;

determining a second height equal to a sum of the adjusted reference point height and a second fraction of a height of the road image, each of the first fraction and second fraction being positive and less than one;

(i) processing the road image to identify a lane candidate within a lane-existing region of the road image, the lane-existing region having (i) a first subregion having the first height with respect to the bottom of the road image, (ii) a second subregion having the second height with respect to the bottom of the road image, and (iii) the reference point, (ii) verifying the lane candidate as a true lane candidate when a minimum distance between (a) a line fit to a portion of the lane candidate in the first subregion and (b) the predetermined reference point is less than a neighborhood distance; and (iii) extending the true lane candidate into the second subregion to form a detected lane marker demarcating the lane marker.

12. The system of claim 11, the image processor being further capable of, when executing the machine-readable instructions to process the road image:

identifying a ridge feature within the road image to generate a ridge-feature image; and identifying, within the ridge-feature image, a plurality of lines each at least partially overlapping the ridge feature.

13. The system of claim 12, the plurality of lines being mutually non-collinear, and the image processor being further capable of, when executing the machine-readable instructions, conjoining the plurality of lines to identify the lane candidate.

14. The system of claim 13, the image processor being further capable of, when executing the machine-readable instructions to conjoin the plurality of lines: executing a morphological operator on the plurality of lines to form the lane candidate.

15. The system of claim 12, the image processor being further capable of, when executing the machine-readable instructions to identify a ridge feature:

computing a first horizontal image gradient partially based on a first image intensity representative of a first image region entirely to the left of the location;

computing a second horizontal image gradient partially based on a second image intensity representative of a second image region entirely to the right of the location; and determining whether the location is part of a ridge feature based on the first horizontal image gradient and the second horizontal image gradient.

16. The system of claim 15, the image processor being further capable of, when executing the machine-readable instructions, determining, based on a vertical position of the location, a horizontal width of at least one of (a) the first image region, (b) the second image region, and (c) the ridge feature.

17. The system of claim 15, the image processor being further capable of, when executing the machine-readable instructions, applying a continuity threshold operation to the ridge feature image to disqualify ridge features not corresponding to a lane marker.

18. The system of claim 17, each ridge feature being formed of a plurality of candidate ridge pixels, the continuity threshold operation having a threshold according to a minimum number of spatially-connected candidate ridge pixels in each candidate ridge feature.

19. The system of claim 12, one of the plurality of lines being fit to a plurality of near control points in the ridge-feature image corresponding to the lane candidate, the near control points being in a near subregion of the ridge-feature image corresponding to the first subregion of the road image.

20. The system of claim 12, the predetermined reference point in the road image being a vanishing point of the road image.

21. The system of claim 11, the image processor being further capable of, when executing the machine-readable instructions to extend the true lane candidate:
- identifying, in the second subregion, a far control point corresponding to the true lane candidate; and
- fitting a curve to the far control point and a plurality of near control points located in the first subregion and corresponding to the true lane candidate.

22. The system of claim 21, the far control point being adjacent to a pixel of the true lane candidate in the first subregion.

23. The method of claim 1, the first fraction being equal to three-quarters, the second fraction being equal to one-sixteenth.

24. The system of claim 11, the first fraction being equal to three-quarters, the second fraction being equal to one-sixteenth.

25. The method of claim 4, the morphological operator being a closing operator.

26. The system of claim 14, the morphological operator being a closing operator.

* * * * *